Aug. 11, 1970 A. HERLET 3,524,115

THYRISTOR WITH PARTICULAR DOPING GRADIENT IN A REGION ADJACENT THE MIDDLE P-N JUNCTION

Original Filed Aug. 9, 1965 3 Sheets-Sheet 1

Aug. 11, 1970 A. HERLET 3,524,115

THYRISTOR WITH PARTICULAR DOPING GRADIENT IN A REGION ADJACENT THE MIDDLE P-N JUNCTION

Original Filed Aug. 9, 1965 3 Sheets-Sheet 3

United States Patent Office 3,524,115

Patented Aug. 11, 1970

3,524,115
THYRISTOR WITH PARTICULAR DOPING GRADIENT IN A REGION ADJACENT THE MIDDLE P-N JUNCTION

Adolf Herlet, Pretzfeld, Germany, assignor to Siemens Aktiengesellschaft, Erlangen, Germany, a corporation of Germany Continuation of application Ser. No. 478,314, Aug. 9, 1965, which is a continuation of application Ser. No. 698,052, Jan. 15, 1968. This application Aug. 1, 1968, Ser. No. 754,120

The portion of the term of the patent subsequent to May 19, 1987, has been disclaimed Claims priority, application Germany, Aug. 12, 1964 S 92,591

Int. Cl. H01l *9/00, 9/12*

U.S. Cl. 317—235 10 Claims

ABSTRACT OF THE DISCLOSURE

Disclosed is a controllable semiconductor rectifier member for high voltage current with a monocrystalline silicon body containing four successive regions of alternating conductivity. In this rectifier member are a constant conductively central region of between 100 and 200$\mu$ thick and possessing a doping concentration between $2.5\times10^{14}$ and $1.0\times10^{14}$ cm.$^{-3}$, and a second central region of opposite conductivity adjacent said constant conductivity central region, the doping concentration in said opposite conductivity region increasing normally substantially according to the exponential function $$C_x=C_0e^{x/\lambda}$$

wherein $\lambda$ has a value of between 7 and 13$\mu$, across a partial distance close to said central region and increasing across another partial distance remote therefrom at a faster rate than exponential until the doping concentration is about two to four powers of ten higher than that of the central region.

This is a continuation of my application Ser. No. 698,052, filed Jan. 15, 1968, which in turn is a continuation of my application Ser. No. 478,314, filed Aug. 9, 1965, and relates to a controllable semiconductor or rectifier device for high voltage current. Such devices are also called thyristors and consist of an essentially monocrystalline silicon body with four successive layers of alternately opposed conductance type, e.g. p-n-p-n or n-p-n-p. A first inside layer has, as compared to the other layers, the lowest degree of doping concentration, which remains substantially constant across the entire thickness of the layer, whereas the concentration values in the adjacent second inside layer, of opposite conductivity, rises with increases in distance, and at first, almost exponentially.

My invention is predicated upon the recognition that the details of this structure, i.e. the measurements of the regions and the characteristics of doping concentrations in the regions, as well as the lifetime of the current carriers, essentially determine the entire complexity of electrical characteristics of the semiconductor member, namely the blocking voltage, the breakover voltage, the forward characteristics, the turn off period, the ignition characteristics, etc. One object of my invention is to adjust the various values to each other to such an extent that an optimum total effect may be obtained for various usages.

According to my invention the first inside layer has a thickness between 100 and 200$\mu$ and a doping concentration between $2.5\times10^{14}$ and $1.0\times10^{14}$ cm$^{-3}$; the maximum doping concentration value in the second inside layer is about two to four powers higher and the path of distance-across which the doping concentration increases by the factor $e$=2.7 in a partial section of the second inside layer, adjacent to the first inside layer, is from 7 to 13$\mu$ long. Using these prerequisites I can obtain optimum measurements of the thickness of the second inside layer while maintaining a moderate concentration gradient. Furthermore, by establishing the maximum value of doping concentration in the second inside layer within the specified limits, it is now possible to meet various demands that are contradictory to each other. By exceeding the specified lower limit, the current at breakover becomes adequately high thereby affording an adequate, thermic stability of the breakover voltage and permitting a relatively high rate of increase in the breakover voltage. Maintenance of the specified upper limits ensures that the control currents meeded for ignition i.e. to start the forward current transmission of the rectifier members need not be too high. A favorable compromise in the simultaneous and mutual accomplishment of these two requirements is obtained from a medium value of about three tenth power.

The drawing describes a particularly favorable embodiment of this type of controllable semiconductor rectifier member and an additional improvement in detail.

FIG. 1 schematically illustrates a cross section profile of a semiconductor component member.

Figure 1:
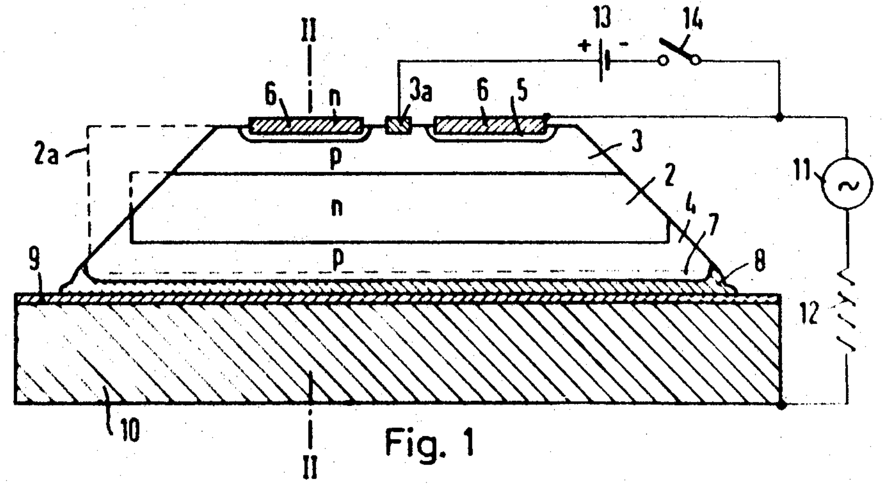

In FIG. 1, 2 denotes the unchanged center of, for example, an n-conducting, disc shaped silicon monocrystal, whose original cross section form is indicated by the dotted supplementary line *2a*, on the left side. Through an overall diffusion of acceptors by conventional processes, the conductance type of the outer layer is converted into p-type. After removing the edge of the semiconductor disc as indicated by dots, which may be done by means of sand blasting and/or etching, the layer sequence of p-n-p results.

A similar result may be obtained by precipitating on both sides of a disc shaped monocrystalline n-type silicon core 2 additional salicon of p-type. This can be accordingly done by the known method of pyrolytic dissociation and deposition from a gaseous mixture of silicon compound, e.g. $SiHCl_3$ or $SiCl_4$, and a carrier reaction gas, e.g. $H_2$. The precipitation is monocrystalline and therefore the disc shaped core 2 around layers 3 and 4 is thickened. This method of depositing, which is known as epitaxy, affords a desired characteristic of the concentration values across the disc thickness, by changing the amounts of doping material added during the process. Layers 3 and 4 may be applied separately at the start, so that the removal of an outside edge region of the thickened disc may be eliminated. The still missing fourth layer may be applied according to the same method by adding a donor substance to the gas mixture to be precipitated and thereby making the outer layer n-conducting.

In the embodiment in FIG. 1, on the other hand, a n-conducting layer 5 is produced through alloying-in a donor containing metal which forms an eutectic alloy with the silicon. Preferably, a gold foil with approximately 1% antimony is used. After heating to above eutectic temperature (appr. 370° C.) to between 750 and 850° C., a recrystallization layer develops during the cooling process. This recrystallization layer has a high donor concentration and constitutes the outer n-conducting layer 5 which is indicated as an n-emitter. The gold-silicon alloy, which solidifies when the temperature falls below the eutectic temperature, forms the contact electrode 6 of the n-emitter. Its shape and thickness, after the gold foil has been alloyed-in completely, are determined by the shape and thickness of said gold foil. The gold foil should be 40 to 50$\mu$ thick and may be ring shaped, for example, as shown in FIG. 1. The recrystallization layer 5 is, therefore, also ring shaped. Within the ring opening, the p-conducting layer 3 extends up to the crystal surface and forms a barrier free contact, for example, by alloying in a boron-containing gold foil. The alloy formed by this boron-containing gold foil with the adjacent silicon amount produces a base electrode 3*a* of a relatively small surface area which serves for the purpose of controlling the rectifier member. Finally an acceptor containing metal, for example an aluminum foil 50 to 70$\mu$ thick and preferably covering the entire disc area, is alloyed at the bottom side of the disc shaped crystal into the p-conducting outer layer 4. This produces a highly doped p-conducting recrystallization layer 7, which forms an outer-most partial section of the p-conducting outer layer and is covered by a contact electrode 8 consisting of an eutectic aluminum-silicon alloy layer.

Layers 7 and 4 together form the p-emitter. During the alloying process, which is preferably performed in a single operation of the contact electrode 6 of the n-emitter of the base contact 3*a*, and of the contact electrode 8 of the p-emitter, a molybdenum disc 10 may also be alloyed onto the contact electrode 8. The molybdenum disc 10 is previously coated, on one side, with an aluminum layer 9 which is applied by an electrolytic method and by annealing means through heating to about 900° C.

A load circuit is connected to both contact electrodes 6 and 8, respectively to the molybdenum disc 10, via contacts, preferably pressure contacts, which are not shown. According to FIG. 1, load circuit may contain an alternating current source 11 and a resistance or load 12. The control circuit which contains a control current source, for example battery 13 and an auxiliary control member, symbolically indicated by switch 14, is connected to the base contact 3*a* and thereby to the p-base and also the adjacent contact electrode 6 of the n-emitter. The current source 13 is poled in forward direction of the p-n junction between layers 3 and 5. The direction of the current from p-emitter to the n-emitter is considered the forward direction of the entire device; this current direction, whereby the center p-n junciton $X_2$ (FIG. 2) is initially blocking in each operating period constitutes the operating direction of the member. Its blocking direction is the opposite current direction, namely from the n-emitter to the p-emitter. The blocking voltage is to be found essentially at the p-n junction $X_3$. If the auxiliary control circuit is synchronously controlled to the alternating current of 11 so that in each positive half cycle a control pulse is supplied to the control contact 3*a*, direct current will flow in the load circuit. By changing the temporary position of the pulses within the half cycle, it is known to effect a change in the average value of the direct current.

Figure 2:
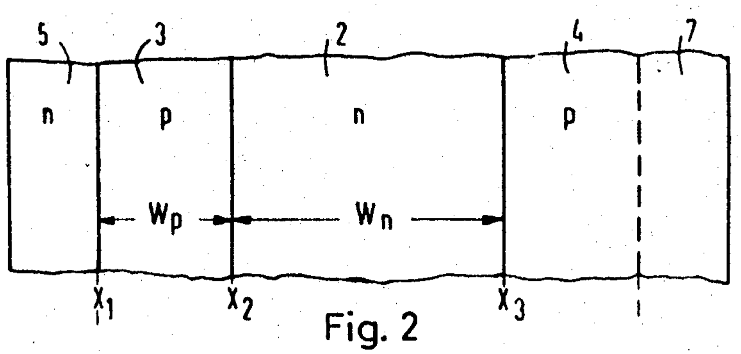
FIG. 2 depicts the succession of the semiconductor layers in the sectional plane II—II of FIG. 1 and serves for determining the position coordinate in appropriate direction.

In the schematic drawing of FIG. 2, the p-n-p-n layer sequence is illustrated.

Figure 3:
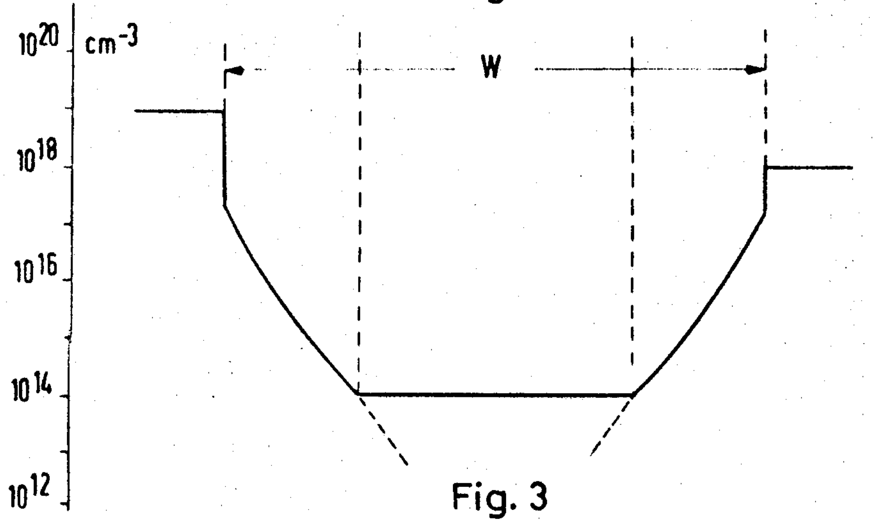
FIG. 3 shows the course of the doping concentrations in the individual layers.

FIG. 3 shows along the abscissa the inherent concentration profile across the coordinate, which runs prependicularly through the layers. The above mentioned core is produced by the n-conducting inside layer, 2 having the most even possible doping concentration of about $10^{14}$ cm.$^{-3}$ and a thickness $W_n$. On both sides, follow layers 3 and 4, via p-n junctions $X_2$ and $X_3$, these layers were made p-conductive for example by diffusion process. The acceptor concentration starts in the p-conducting inside layer 3, near the p-n junction $X_2$, at a starting value of approximately $10^{14}$ cm.$^{-3}$ and rises almost exponentially to a value of somewhat above $10^{17}$ cm.$^{-3}$ which is reached at the indicated thickness $W_p$, at the p-n junction $X_1$. The same thickness is assumed for layer 4. The concentration in this layer may be an exact image of the concentration in layer 3, due to their common production by a diffusion process.

Contrary to the depositing process by which, as stated, any desired concentration profile may be produced, the diffusion process is dependent on the natural rules of diffusion with parameters of the diffusion constants and other material values, the temperature, the pressure and the time period. But even diffusion may have various variation possibilities available for influencing the concentration course, for example the use of several acceptor, or donor substance with variable diffusion constants, such as boron and gallium, arsenic and phosphorus, simultaneously or successively, and/or a temporary alternation of diffuing in and out. This alternation may produce, among other things, concentration characteristics at a maximum finite distance from a semiconductor surface. Other possibilities are afforded by known masking methods.

Layer 4 forms only a part of the outer p-conducting layer. The latter also contains partial outer section 7, wherein the acceptor concentration, due to the above described alloying process, may have a value of $10^{18}$ cm.$^{-3}$. An alloying process also produces the n-conducting outer layer 5, wherein the donor concentration may amount to a value of approximately $10^{19}$ cm.$^{-3}$. Between this layer and the outer partial section 7 of the p-conducting outer layer lies the center region which is filled with electrons and holes during the operation of the rectifier. The highly doped outer layers supply the center region with the aforementioned electrons and holes. The thickness of this center region is marked with W. In the above illustrated embodiment, the center region, includes the p-conducting inside layer 3, the n-conducting inside layer 2 and the weakly doped partial section 4 of the p-conducting outer layer.

The following embodiments present factors for optimum selection of the layer thickness, for the height and characteristics of the doping concentrations within the individual layers according to my invention.

A favorable further development from the point of view of a best possible total result lies, among other things, in the fact that the doping concentration in the n-conducting inside layer is maintained between $2.5\times10^{14}$ to $1.0\times10^{14}$ cm.$^{-3}$. This corresponds to a specific resistance between 20 and 40 ohm-cm. A medium value of doping concentration of the n-conducting inside layer is preferred, corresponding to a specific resistance of approximately 30 ohm.-cm. This selection is a perrequisite for achieving a particularly high blocking capacity in both directions. The aforementioned selection of the acceptor concentration in the p-conducting inside layer constitutes prerequisite for a high blocking capacity of the center p-n junction $X_2$. This determines the amount of breakdown voltage in forward direction. At a given value of the specific resistance in the n-conducting inside layer, the breakdown voltage will be the higher, the flatter the doping gradient in the p-conducting inside layer. However, the latter should not be too flat since as a result thereof the layer may be too thick and because of this forward voltage is too high or else the produtcion process may become too difficult. Therefore, another preferred embodiment consists in the fact that path $\lambda$ across which the acceptor concentration, in the p-conducting inside layer, adjacent to the inside p-n junction, ascends perpendicularly to said p-n junction by the factor $e=2.7$, is 7 to 13$\mu$ long.

In many cases a medium value of $\lambda \approx 10\mu$ will yield favorable results. $\lambda$ will be defined further with respect to FIG. 6 infra.

Another improvement is also possible though the fact that the ascension of the acceptor concentration in the p-conducting inside layer proceeds more steeply at a greater distance from the center p-n junciton than is the case in the aforementioned exponential function. In this instance, a relatively flat gradient, adjacent to the p-n junction, may be combined with a relatively small thickness of the p-base. The practical execution of this is described above in connection with the specific example. By using p-conducting inside layer from 30 to $60\mu$ thick, I can make the aforementioned prerequisites correspond to the technical production possibilities.

The same considerations relative to the blocking capacity apply also for the p-n junction $X_3$, between the n-conducting inside layer and the p-conducting outside layer. Therefore, the characteristic of the acceptor concentration in the p-conducting outer layer, starting from the p-n junction, is made symmetrical to the characteristic of the acceptor concentration in the p-conduting inside layer, according to the embodiment example shown in the drawing.

Additional improvements result from the selection of the concentration values in the outer regions. In the forward condition, the above serve as source regions wherefrom the center region is filled or flooded with current carriers of both polarities. Therefore, doping concentrations which were selected too low would result, in said source regions, in inadequate flooding, and therefore to an objectionably high forward voltage drop. Hence, it is favorable to select the doping concentration in the outer n-conducting layer about $10^{18}$ cm.$^{-3}$ or higher. A similarly high concentration is preferably produced in an outermost partial section of the p-conducting outer layer. The known alloying process is particularly well suited for producing, the high concentrations in the two outer regions and was, therefore, used in the specific example described above.

Figure 4:
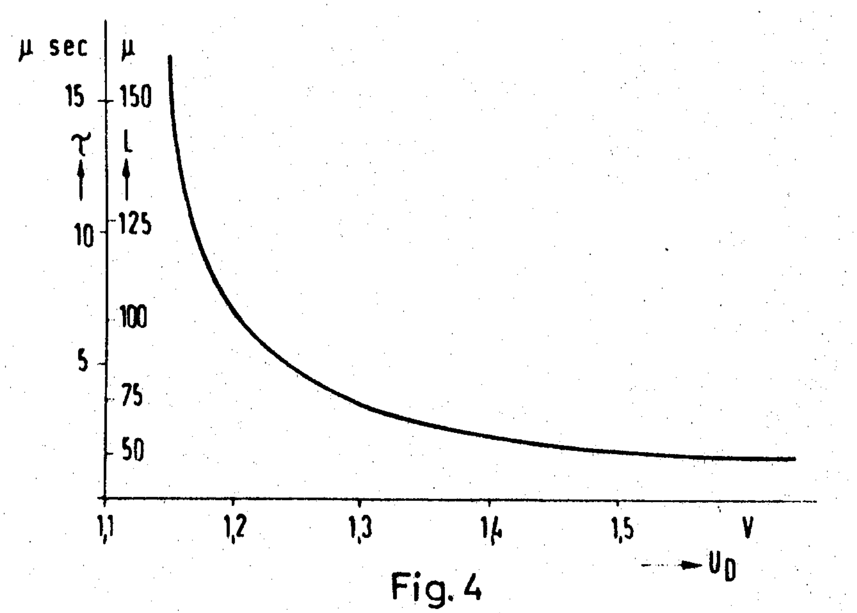
FIGS. 4 and 5 show mathematically established relations of various magnitudes to certain material characteristics and measurements and show the influences of the latter to each other.

The high doping of the outer layers alone does not suffice for an adequately low forward voltage drop, rather the current carriers owing to their diffusion distance must be able to flood, almost evenly, the entire middle region between the two layers. The meaning of this requirement is shown in FIG. 4, which shows for a controlled rectifier member, of given layer structure and size, the dependence between the forward voltage $V_{1D}$, i.e. the voltage drop produced at the rectifier member by a forward current of specific height, and the lifetime $\tau$ or the diffusion length L. The curve applies to a thickness $W=250\mu$ of the flooded center region and to a current density of 200 a./cm.$^2$, relative to the area of the smaller of the two emitters, i.e. in FIG. 1 of n-emitter 5. One recognizes that the higher the forward voltage, the lower the diffusion length L of the charge carriers, under otherwise similar circumstances. This diffusion length, which increases with strong injection, corresponding to the stated value of the current density, is differently defined and therefore different from the diffusion length $L_p$, mentioned below, which applies only in case of weak injections. Furthermore, diffusion length L is a common magnitude for both carrier types, in cases of strong injections. A sufficiently even flooding of the center region may be produced by supplying the center region with a thickness W having a value between double and four times that of the diffusion length L in connection with strong injections, i.e. corresponding to a scope current density of more than 10 a./cm.$^2$. Greater thickness W would result in objectionably high values of forward valtage drop and a smaller thickness would markedly reduce the blocking capacity, since either the thickness of the p-base would have to be reduced, i.e. the concentration gradient adjacent to the central p-n junction would have to be steeper, or else the thickness of the n-base would have to be made too small. However the last mentioned is important for the blocking capacity to be achieved.

Figure 5:
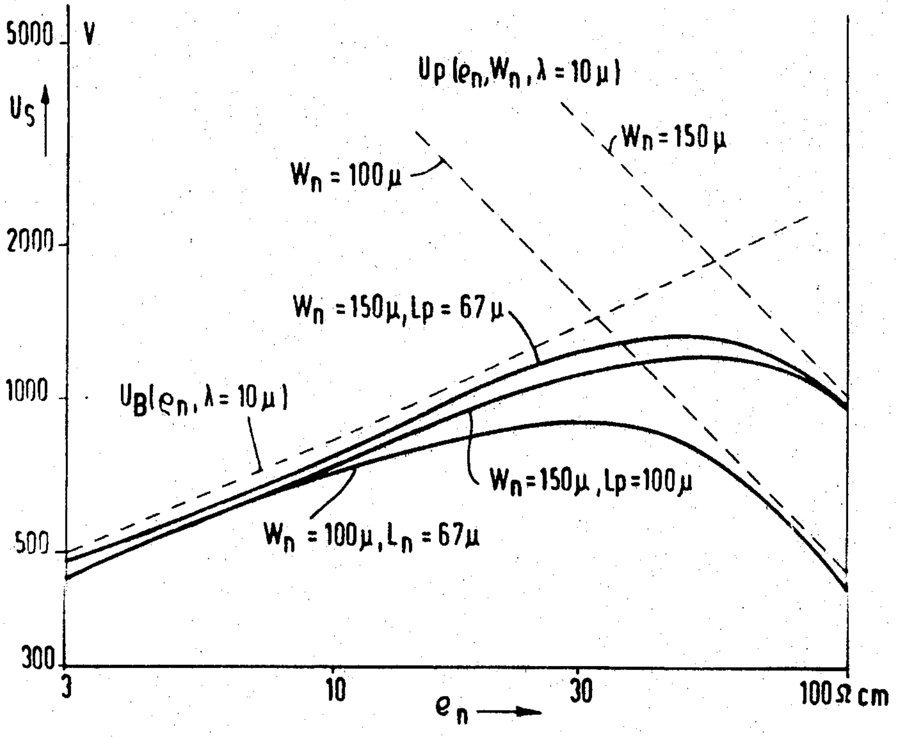

This may be recognized from FIG. 5, which illustrates the highest blocking voltage $V_S$ (determined by calculations) which may just about block a controllable rectifier member, in dependence of the specific resistance $\rho_n$ of the n-conducting inside layer for various thicknesses $W_n$ of the latter and for various values of diffusion length L of minority carriers present in this layer. The values for the individual curves are listed in the figure. FIG. 5 also shows, by means of a dotted line, the limit curve of the breakdown voltage $V_B$ and the limit lines of the punchthrough voltages $V_P$ which have been calculated for the same values of thickness $W_n$. The entire diagram is based upon the assumption that the gradient of the acceptor concentration in both p-layers, adjacent to p-n junctions $X_2$ and $X_3$, has a value according to $\lambda=10\mu$. In a steeper course, corresponding to a smaller $\lambda$ value all $U_S$ value would be lower, and vice versa. The above observations regarding blocking capacity also apply to these conditions, namely symmetry of concentration characteristics in layers 3 and 4, also for breakover voltage.

Furthermore, FIG. 5 illustrates that the selection of $\rho$ values of 20 to 40 ohms leads to favorable results. However, for $W_n=150\mu$ the maximum for the curve is larger than 40 ohms for a $\rho$ value, but it is not advisable to exceed the last mentioned value since this impairs the temperature stability of the breakover voltage and the permissible steepness of the voltage ascent in forward direction would be lower. In this connection, let us also explore the influence of value $\tau$. At the same total thickness of the silicon body, an enlargement of $\tau$ (lifetime) would produce thicker p-layers at the expense of the thickness $W_n$ of the p-conducting inside layer. This more than compensates for an increased blocking capacity in connection with an increased $\lambda$ and even leads to a reduction of the blocking capacity in the total effect. The selection of a smaller $\tau$ would mean that the entire curve of the breakdown voltage $U_B$ is shifted downward. In this event, to achieve an adequate blocking capacity, a larger value of $\rho$ would have to be selected, however as previously mentioned this would impair the temperature stability of the breakover voltage.

In addition, the following is shown from FIG. 5: the larger the thickness $W_n$, the higher the blocking capacity. However, one should not exceed $200\mu$, since this would make it impossible to comply with the prerequisite that the thickness W of the center region, which is flooded by current carriers during the passage of current in forward direction, should not exceed by four times, with high injections, the diffusion length L. Also, in order to utilize the greater thickness, $W_n$, one would have to adopt higher $\rho$ values which is unfavorable due to the previously stated reasons. Hence, it appears favorable to select, for the n-conducting inside layer, a thickness $W_n$ between 100 and $200\mu$. The indicated lower limit should not be any lower to ensure a blocking capacity which would still suffice for normal purposes.

On the other hand, as seen from a comparison of both upper curves in FIG. 5, the lower the blocking capacity, the higher the diffusion length of the minority carriers, at weak injections, corresponding to a maximum scope current density of approximately 100 ma./cm.$^2$. Thus, in the interest of adequate blocking capacity, the ratio of $W_n$ to $L_p$ should not be too small. The minimum value for the aforementioned value is 1.5. However, it is not advisable to choose this ratio larger than 2.5. As seen from FIG. 5, the last mentioned ratio approaches rather closely the limit of the breakdown voltage indicated by the $V_B$ curve. In practice, this $V_B$ curve is obtained for a ratio value $W_n$ to $L_p=\infty$. Therefore, even a considerable increase of the ratio value above 2.5, would yield only slight advantages relative to the blocking capacity. On the other hand, only a modest exceeding of the indicated value fulfills the requirement that the thickness of the flooded center region should not be more than four times the diffusion length when using high injections. As a rule, a silicon type with small diffusion length has, in case of weak injections, also a smaller diffusion length at strong injections than another silicon type under otherwise similar conditions.

Another possibility for selecting the $L_p$ and $W_n$ values still exists within the previously limited scope, namely according to the purpose for which the thyristor is earmarked. Here, one may differentiate between regular thyristors, which are indicated for the main power supply, and especially fast thyristors which are destined for use, among others, for choppers, automatic transformers, etc., and the shortest possible turn off times. Under turn off time, I mean the time period needed to make the load carriers, present in the flooded center region, disappear so far, during a sudden current interruption, that the returning voltage may not produce an unvoluntary ignition of the thyristor. These fast thyristors are produced by selecting a value of between 50 and 70$\mu$ for the $L_p$ and a value between 100 and 140$\mu$ for the $W_n$. As FIG. 5 illustrates, one has to accept a somewhat smaller blocking capacity, as a result. By contrast, rectifiers guided by the power supply net depend less on a short turn off time, but more on the highest possible blocking capacity and a small forward voltage. For this type of utilization, one preferably selects for $L_p$ a value between 70 and 100$\mu$ and for $W_n$ a value between 140 and 200$\mu$.

In the interest of clarity and simplicity, the invention is described under the assumption that the core of the layer sequence is represented by an n-conducting inside layer which is doped evenly and lower than the rest of the layers with p-conducting layers joining said core on both sides; the doping concentration of the last mentioned layers increases with added distance from the core layer. The p-layers border outwardly highly doped regions, namely the one with the p-n junction bordering the fourth n-conducting layer and the other one without the p-n junction bordering also a p-conducting region. It is, however, within the present contemplation that the same teaching and its supplements are applicable in all details also in case of interchanged conductance types p and n, i.e. for a layer sequence with p-conducting core layer of lowest doping concentration and an appropriately high concentration of the remaining layers, whereby only the correspondingly higher resistance values of the p-conducting silicon need to be inserted to the indicated concentration values, in a known manner.

Figure 6:
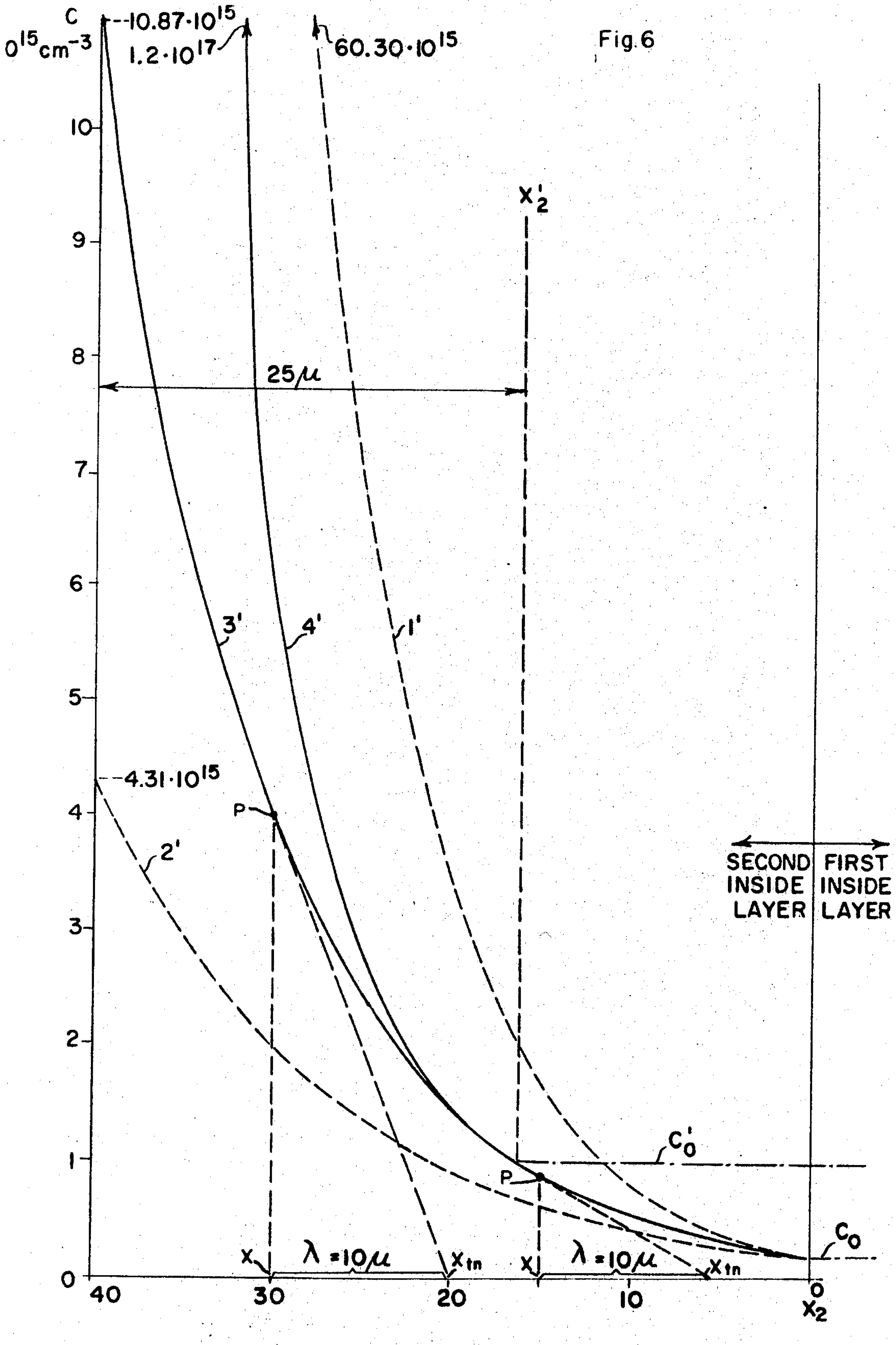
FIG. 6 shows various examples of concentration profiles of the second inside layer in a linear coordinate system.

The invention is further described with respect to FIG. 6 which is explanatory only. FIG. 6 shows various examples of concentration profiles of the second inside layer, in a linear system of coordinates. The term "concentration profile" indicates the curve of the course of the doping concentration in cm.$^{-3}$, depending on the layer thickness in $\mu$. The total thickness of the second inside layer is assumed, in accordance with the application example, as 40$\mu$. The p-n junction $X_2$ is chosen as the zero point of the abscissa. At this location the concentration curves intersect the horizontal line; value $C_0$ represents the doping concentration in the first inside layer. According to definition, this intersection point constitutes the p-n junction. Starting here, the sketch shows three exponential curves 1', 2' and 3' which correspond to the well known equation $$C_x = C_0 e^{x/\lambda}$$

The magnitude $\lambda$ is known to be a parameter which determines the steepness of the rise of the exponential curve which illustrates, in a drawing, such as FIG. 6 hereof, the curve of the doping concentration that is determined by said equation. In this illustration, $\lambda$ is the subtangent of the assigned exponential curve. The magnitude $\lambda$ is obtained as the distance between the abscissa point $x$, which is positioned vertically below an arbitrary point P of the exponential curve and the point of intersection $x_{tn}$ of the tangent, to the curve at the same point P, with the abscissa axis, i.e. $\lambda = x - x_{tn}$. This distance, i.e. the subtangent, is known to be always the same length for arbitrary points of an expoential curve, determined by a given magnitude $\lambda$. Moreover, the ordinate of the exponential curve which belongs to the abscissa $x$ always has a larger value by the factor $e$ than the ordinate which belongs to the abscissa $x_{tn}$. The smaller $\lambda$ is the stepper, therefore, the rise of the exponential curve, determined by the former.

Hence, for the start of such a curve, a very specific gradient of the doping concentration is determined by a given magnitude $\lambda$. According to FIG. 6, the choice for curve 1', $\lambda = 7\mu$, for curve 2', $\lambda = 13\mu$, and for the solid curve 3', $\lambda = 10\mu$. For the last mentioned curve, FIG. 6 shows, in two places, the subtangent, which according to the exponential law also has the value $\lambda = 10\mu$.

According to my invention, the curve of the doping concentration of $C_0$ value, of for example $0.2 \cdot 10^{15}$, should rise at the right boundary surface of the second inside layer, at such low gradient, that the curve will be in the region between the two dashed curves 1' and 2'. Thus, the rise could be effected, for example, corresponding to the solid curve 3'. However, this curve 3' intersects the left boundary line of the second inside layer, at a value of $C = 10.87 \cdot 10^{15}$ cm.$^{-3}$. Thus, the curve does not meet the requirement that the maximum value of doping concentration should be by 2 to 4 powers of ten higher than the initial value. Neither is this prerequisite met by the steeper exponential curve 1', which would intersect the left edge line, at a concentration value of $60.3 \cdot 10^{15}$ cm.$^{-3}$. To meet the arofementioned condition, a concentration curve of a still greater steepness would be required. However, in the case of a purely exponential curve, the gradient at the right boundary face would be higher than is permissible in accordance with my invention. The rise in the doping concentration should show a steeper curve in a region which is further removed from the first inside region. Such a course is shown, for example, by curve 4', whose point of intersection with the left boundary line is at $1.2 \cdot 10^{17}$ cm.$^{-3}$. This curve may easily be obtained by means of pyrolytic dissociation and precipitation of silicon, with an addition of doping substance or by diffusion with a temperature curve temporally changed by control, or/and a combination of various doping substances with variable diffusion constants.

FIG. 6 also shows a case wherein the doping concentration in the first inside layer (central region) has a higher value $C_0' = 1 \cdot 10^{15}$ cm.$^{-3}$. Then, a doping profile which is the right partial section of the second inside layer (region of higher conductivity) proceeds according to curve 3'; the point of intersection with the horizontal line $C_0'$ would be at $X_2'$. The total thickness of the second inside layer (region of higher conductivity) would then amount only to 25$\mu$ instead of 40$\mu$. It can thus be seen that by changing one value, a second value will also be considerably altered. This offers the proof that in a layer sequence with given thickness dimensions and a given concentration profile, a value may not be arbitrarily chosen or changed, without influencing another value by this selection or change.

I claim:

1. In a controllable semiconductor rectifier member for high voltage current with a monocrystalline silicon body containing four successive regions of alternating conductivity, a first, a second and a third p-n junction respectively therebetween, a constant conductivity central region of between 100 and 200$\mu$ thick possessing a doping concentration between $2.5 \times 10^{14}$ and $1.0 \times 10^{14}$ cm.$^{-3}$, a second central region of opposite conductivity adjacent said constant conductivity central region, the doping concentration in said opposite conductivity region increasing in the direction from and normally to said second p-n junction substantially according to the exponential function $$C_x = C_0 e^{x/\lambda}$$

wherein λ has a value of between 7 and 13μ, across a partial distance close to said central region and increasing across another partial distance remote therefrom at a faster rate than according to said exponential function with said value of λ until the doping concentration is about two to four powers of ten higher than that of the central region.

2. The rectifier member of claim 1, wherein the ratio of the thickness of the constant conductivity central region to the diffusion length in weak injection of the minority carriers of the region, corresponding to a scope current density of about 100 m. ma./cm.$^2$, between 1.5 and 2.5.

3. The rectifier member of claim 2, wherein said diffusion length has a value between 50 and 70μ, and the constant conductivity central region is between 100 and 140μ thick.

4. The rectifier member of claim 2, wherein said diffusion length has a value between 70 and 100μ, and the constant conductivity central region is between 140 and 200μ thick.

5. The rectifier member of claim 1, wherein said constant conductivity central region is n-conductive and has a specific resistance of approximately 30 ohms-cm.

6. The rectifier member of claim 1, wherein the highest value of doping concentration in the opposite conductivity central region is approximately three powers of ten higher than the lowest one.

7. The rectifier member of claim 1, wherein λ is 10μ.

8. The rectifier member of claim 1, wherein the second opposite conductivity central region is between 30 and 60μ thick.

9. The rectifier member of claim 1, wherein the doping concentration in the opposite conductivity central region and in an outer layer of the same type, are symmetrical to each other with the constant conductivity layer inbetween.

10. The rectifier member of claim 1, wherein the doping concentration in the outer layer, which is adjacent to the opposite conductivity central region, is at least about $10^{18}$ cm.$^{-3}$, and the outer layer bordering the constant conductivity central region has a superficial partial layer wherein the doping concentration is at least about $10^{18}$ cm.$^{-3}$ and the entire center region between the two highly doped outer layers, which is flooded by injected current carriers during current passage in forward direction, has a thickness between two and four times the diffusion length L, in high injections, corresponding to a scope current density of from 10 a./cm.$^2$ to approximately 200 a./cm.$^2$.

References Cited

UNITED STATES PATENTS

| | | | |
|---|---|---|---|
| 2,980,832 | 4/1961 | Stein | 317—235 |
| 2,989,426 | 6/1961 | Rutz | 148—1.5 |
| 3,097,335 | 7/1963 | Schmidt | 321—45 |
| 3,209,428 | 10/1965 | Barbaro | 29—25.3 |
| 3,261,985 | 7/1966 | Somos | 307—88.5 |

OTHER REFERENCES

Hunter, Handbook of Semiconductor Electronics, secs. 7–18 to 7–20, McGraw-Hill, New York, 1962, 2nd edition.

Hunter, Handbook of Semiconductor Electronics, pp. 7–18 to 7–20.

JOHN HUCKERT, Primary Examiner

M. H. EDLOW, Assistant Examiner

U.S. Cl. X.R.

317—234